(12) United States Patent
Birner

(10) Patent No.: US 12,358,565 B2
(45) Date of Patent: Jul. 15, 2025

(54) TRUNK LID FOR CLOSING A TRUNK OF A NOTCHBACK MOTOR VEHICLE AND MOTOR VEHICLE

(71) Applicant: Bayerische Motoren Werke Aktiengesellschaft, Munich (DE)

(72) Inventor: Stefan Birner, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 583 days.

(21) Appl. No.: 17/421,622

(22) PCT Filed: Dec. 16, 2019

(86) PCT No.: PCT/EP2019/085225
§ 371 (c)(1),
(2) Date: Jul. 8, 2021

(87) PCT Pub. No.: WO2020/148043
PCT Pub. Date: Jul. 23, 2020

(65) Prior Publication Data
US 2022/0126925 A1    Apr. 28, 2022

(30) Foreign Application Priority Data
Jan. 16, 2019   (DE) .................... 10 2019 101 062.4

(51) Int. Cl.
*B62D 25/10*   (2006.01)
*B62D 29/00*   (2006.01)
*H01Q 1/32*    (2006.01)

(52) U.S. Cl.
CPC ......... *B62D 25/105* (2013.01); *B62D 29/005* (2013.01); *H01Q 1/3241* (2013.01); *H01Q 1/3275* (2013.01)

(58) Field of Classification Search
CPC .. B62D 25/105; B62D 29/005; H01Q 1/3241; H01Q 1/3275
See application file for complete search history.

(56) References Cited

U.S. PATENT DOCUMENTS 4,886,312 A * 12/1989 Asoh ................... B62D 25/105
                                                             296/76
6,478,368 B1    11/2002 de Gaillard
(Continued)

FOREIGN PATENT DOCUMENTS

DE    195 35 250 A1    3/1997
DE    100 25 051 C1    11/2001
(Continued)

OTHER PUBLICATIONS

JP2002330014A computer translation provided (Year: 2002).*
(Continued)

*Primary Examiner* — Jason S Morrow
(74) *Attorney, Agent, or Firm* — Crowell & Moring LLP

(57) ABSTRACT

A trunk lid for closing a trunk of a notchback motor vehicle includes at least one inner part having a receiving space for at least one antenna of the motor vehicle and at least one outer cladding part connected to the inner part. The outer
(Continued)

cladding part is formed of a material that is permeable to radio waves at least in a region where radio waves are to pass through. A notchback motor vehicle includes the truck lid.

11 Claims, 3 Drawing Sheets

(56) References Cited

U.S. PATENT DOCUMENTS

| | | | |
|---|---|---|---|
| 6,900,769 B2 * | 5/2005 | Schlieber | B62D 29/005 343/873 |
| 9,755,299 B2 * | 9/2017 | Lee | B32B 17/10376 |
| 2002/0135200 A1 | 9/2002 | De Gaillard | |
| 2004/0036658 A1 * | 2/2004 | Schlieber | B62D 25/105 343/711 |
| 2014/0118199 A1 | 5/2014 | Kittinger et al. | |

FOREIGN PATENT DOCUMENTS

| | | |
|---|---|---|
| DE | 199 43 716 C2 | 9/2002 |
| DE | 201 16 106 U1 | 2/2003 |
| DE | 102 00 750 A1 | 7/2003 |
| DE | 10 2007 024 163 A1 | 12/2008 |
| DE | 10 2011 121 405 A1 | 6/2013 |
| DE | 10 2013 221 645 A1 | 4/2014 |
| DE | 10 2017 002 994 A1 | 9/2017 |
| JP | 2002330014 A * | 11/2002 ......... B60C 23/0444 |
| KR | 10-0774716 B1 | 11/2007 |
| WO | WO 02/47198 A2 | 6/2002 |

OTHER PUBLICATIONS

JP-2002330014-A computer translation (Year: 2002).*

"Heckklapper aus GFK", Heckklappe aus GFK—Lackiererblatt, Oct. 31, 2019, pp. 1-7, with English translation, Retrieved from www.lackiererblatt.de (eight (8) pages).

English translation of Chinese-language Office Action issued in Chinese Application No. 201980088330.1 dated Nov. 11, 2022 (six (6) pages).

International Search Report (PCT/ISA/210) issued in PCT Application No. PCT/EP2019/085225 dated Mar. 23, 2020 with English translation (six (6) pages).

German-language Written Opinion (PCT/ISA/237) issued in PCT Application No. PCT/EP2019/085225 dated Mar. 23, 2020 (nine (9) pages).

German-language Office Action issued in German Application No. 10 2019 101 062.4 dated Feb. 4, 2021 (five (5) pages).

* cited by examiner

TRUNK LID FOR CLOSING A TRUNK OF A NOTCHBACK MOTOR VEHICLE AND MOTOR VEHICLE

BACKGROUND AND SUMMARY OF THE INVENTION

The invention relates to a trunk lid for closing a trunk of a notchback motor vehicle. In addition, the invention relates to a notchback motor vehicle which is equipped with such a trunk lid.

Modern motor vehicle trunks for motor vehicles which are equipped with a notchback are at least mainly manufactured from a metallic material. In a conventional notchback motor vehicle, that is to say a motor vehicle which is equipped with such a conventional trunk lid, this means that transmission and/or reception devices for transmitting information and/or data between the motor vehicle and devices in the surroundings of the motor vehicle are surrounded by a metallic material. This is because both a metallic shell and/or a metallic outer skin of the motor vehicle, on the one hand, and the metallic trunk lid, on the other hand, impede relevant radio waves by means of which the motor or its transmission and/or reception devices exchange data with the corresponding devices in the surroundings of the motor vehicle, that is to say communicate with them. There is also a need to construct the motor vehicle at least in certain areas in such a way that radio waves are shielded only to a particularly small extent by the outer skin of the motor vehicle.

For example, DE 100 25 051 C1, DE 102 00 750 A1 and DE 199 43 716 C2 each disclose a vehicle roof which is fabricated at least in certain areas from glass or plastic. However, these roof designs do not permit the transmission and/or reception devices of the motor vehicle to have an improved transmission performance and/or reception performance if the motor vehicle is a notchback motor vehicle and the transmission and/or reception devices, in particular their respective antenna, are arranged in the trunk of the notchback motor vehicle, which can be closed by means of a conventional metallic trunk lid, irrespective of the corresponding roof design of the notchback motor vehicle. It is to be understood here that the trunk lid for the notchback motor vehicle is usually embodied without a window (in contrast to a station wagon or a fastback motor vehicle), and when the trunk is opened or closed by means of the trunk lid a rear windshield of the motor vehicle remains stationary in situ with respect to a shell of the motor vehicle. In this context, a convertible is thus also to be considered a notchback motor vehicle. The motor vehicle can also be constructed in particular as a passenger car.

During fabrication, in particular series fabrication, of the modern notchback motor vehicles there is, however, still a need to arrange antennas in the region of the trunk of the motor vehicle, in particular in the trunk lid.

An object of the invention is to provide a trunk lid and a motor vehicle in which transmission and/or reception devices which are arranged in the interior of the motor vehicle can be operated particularly efficiently.

This object is achieved according to the invention by means of a trunk lid and by means of a motor vehicle with such a trunk lid in accordance with the independent claims. Advantageous embodiments of the invention are the subject matter of the dependent patent claims and the description. Advantages and advantageous embodiments of the trunk lid according to the invention are to be considered advantages and advantageous refinements of the motor vehicle according to the invention, and vice versa.

A trunk lid according to the invention for closing a trunk of a notchback motor vehicle has at least one inner part which comprises a receptacle for at least one antenna of the motor vehicle. Furthermore, the trunk lid has at least one outer paneling part which is connected to the inner part. This means that the antenna of the motor vehicle, which is assigned to a transmission and/or reception device of the motor vehicle, can be attached in particular to the inner part of the trunk lid by means of the receptacle on the trunk lid. Consequently, the antenna is connected in a wireless fashion and/or wired fashion to the transmission and/or reception device of the motor vehicle and is designed to transmit and receive radio waves for data communication. Correspondingly, the transmission and/or reception device can be, for example, a vehicle-internal navigation system, an analog and/or digital radio receiver, a mobile radio transmitter and receiver, a transmitter or receiver of a vehicle central locking system, etc.

The motor vehicle is in particular a passenger motor vehicle which has a notchback. Such a notchback motor vehicle can take the form, for example, of a sedan, a coupe or a convertible. In particular, this notchback motor vehicle is not a station wagon, a fastback motor vehicle, a sport utility vehicle (SUV) or some other motor vehicle in which it is possible to access the trunk from a passenger cell without adjusting an interior space of this motor vehicle. For example, in particular motor vehicles whose trunk is separated from the respective passenger cell only by a row of seats and/or by an adjustable parcel shelf or loading space cover, are not considered to be notchback motor vehicles according to this application. A further criterion to be met by a notchback motor vehicle is that when the trunk lid is adjusted between its closed position, in which the trunk lid closes off the trunk from the surroundings of the motor vehicle, and open position, in which the trunk is opened to the surroundings of the motor vehicle, a possibly present rear windshield of the motor vehicle remains stationary, that is to say unmoved, in situ.

In order then to ensure that the transmission and/or reception devices in the interior of the motor vehicle can be operated particularly efficiently, there is provision according to the invention that the outer paneling part of the trunk lid is constructed, at least in a region through which radio waves pass, from a material which is permeable to radio waves. The term "permeable to radio waves" is to be understood here as meaning that power dissipation during the transmission or reception of radio waves by means of the transmission and/or reception devices is particularly low. In other words, at least in the region of the outer paneling part through which radio waves pass, there is advantageously only a particularly small extent of shielding of the radio waves between the transmission and/or reception devices and corresponding opposing points in the surroundings of the motor vehicle. This makes it possible for an antenna or a plurality of antennas to be mounted in the trunk lid, for example on the inner part of the trunk lid, and completely on the inside of the outer paneling part. A correct transmission and/or reception function of the transmission and/or reception devices which interact with the antenna or the antennas is nevertheless ensured.

It is firstly beneficial to a particularly advantageous and/or pleasing silhouette of the motor vehicle if antennas arranged on the outer skin or on the outer paneling part of the trunk lid are dispensed with, in particular in the region of the trunk lid or on a roof of the motor vehicle.

Consequently, secondly, cabling between the transmission and/or reception devices and the respectively associated antennas on the outer skin or on the outer paneling part (for example leading to corresponding roof antennas) can also be eliminated, since the corresponding antennas can be or are arranged in an adjacent region of the corresponding transmission and/or reception device, that is to say on the inside of the outer paneling part. As a result, the notchback motor vehicle can be manufactured particularly efficiently in terms of mass, as a result of which the notchback motor vehicle can be operated particularly efficiently in terms of energy or fuel and/or with low emissions.

In particular a non-metallic material is considered suitable as the material which is permeable to radio waves.

In one advantageous refinement, the material which is permeable to radio waves forms a reinforcement element of the trunk lid. Therefore, the material which is permeable to radio waves can be, for example, harder than the rest of the material of the trunk lid, as a result of which the torsional rigidity, that is to say the resistance to torsion, of the trunk lid is particularly strong. Use of the material which is permeable to radio waves as a reinforcement element of the trunk lid can go in particular so far that a metallic shell of the trunk lid can be made smaller and/or lighter in weight or can even be eliminated completely. Owing to stabilizing properties of the reinforcement element or of the material which is permeable to radio waves, the required level of rigidity and/or stability of the trunk lid is retained here. Therefore if the metallic shell which is embodied in a particularly small or lightweight fashion is used or if it is eliminated entirely, the trunk lid comes to have an even smaller shielding effect on the radio waves of the transmission and/or reception devices of the motor vehicle or on the corresponding opposing points. In addition, the motor vehicle which is equipped with the trunk lid can be manufactured even more efficiently, so that it can still be operated more efficiently in terms of fuel or energy and/or with lower emissions.

A plastic and/or a fiber-reinforced composite material are/is conceivable as the material which is permeable to radio waves. However, it has proven particularly advantageous if the material which is permeable to radio waves comprises a glass. Accordingly, the trunk lid can be embodied at least partially from glass, that is to say in particular in the region through which radio waves pass. It is advantageous here that the glass has a particularly high degree of hardness in contrast to a metallic material, as a result of which the glass or the material which is permeable to radio waves is particularly rigid and resistant to torsion. Nevertheless, the glass is particularly permeable to radio waves, that is to say the glass shields the radio waves of the transmission and/or reception devices or of the opposing points only to an extremely small degree. In addition, the material which is permeable to radio waves and which comprises the glass can be used as a design element by virtue of the fact that the material which is permeable to radio waves or the glass contrasts in a particularly esthetic fashion with a customary, that is to say painted, outer skin of the motor vehicle.

The trunk lid with the material which is permeable to radio waves and which at least comprises the glass or can be formed at least essentially completely from the glass therefore has multifunctionality, specifically the permeability to radio waves, the particularly advantageous stability and the design element.

It is also advantageous if the material which is permeable to radio waves extends completely at least between two edges of the trunk lid which are opposite one another. That is to say the material which is permeable to radio waves extends completely, for example, between two longitudinal edges and/or between two transverse edges of the trunk lid. In this context, the longitudinal edges or transverse edges are respective longitudinal end edges or transverse end edges at which the trunk lid ends. In other words, at the longitudinal end edges or transverse end edges the trunk lid directly adjoins other outer skin components of the notchback motor vehicle. If the material which is permeable to radio waves therefore extends, for example, over a complete width of the trunk lid, a region through which radio waves pass which has a particularly large area is therefore formed and the trunk lid has a particularly high level of stability.

It is particularly preferred if, in the region through which radio waves pass, a material thickness of the outer paneling part is formed completely by the material which is permeable to radio waves. This means that the outer paneling part of the trunk lid is free of a substructure or a carrier element in the region through which radio waves pass, since the material which is permeable to radio waves is self-supporting, at least in the region through which radio waves pass. The trunk lid is accordingly completely formed, at least in the region through which radio waves pass, by the material which is permeable to radio waves and is not for example merely coated with the material which is permeable to radio waves. This ensures that the radio waves pass particularly efficiently through the material which is permeable to radio waves and/or through the outer paneling part of the trunk lid.

According to a further embodiment there is provision that a first partial surface of the outer paneling part outside the region through which radio waves pass and a second partial surface of the outer paneling part in the region through which radio waves pass terminate flush with one another. This means that an overall surface of the trunk lid is formed by the first partial surface and the second partial surface. In particular, if the trunk lid outside the region through which radio waves pass is manufactured from the metallic material, for example from sheet metal, the sheet metal and the material which is permeable to radio waves terminate flush with one another. The first partial surface and the second partial surface can be arranged, for example, on the outer skin of the notchback motor vehicle or on an outer surface of the trunk lid facing the surroundings of the notchback motor vehicle. This results in a particularly esthetic appearance of the trunk lid. Furthermore, the trunk lid is embodied in a particularly smooth way, in particular on the outer surface, as a result of which the outer surface of the trunk lid is, firstly, particularly aerodynamic and, secondly, particularly easy to clean.

Moreover, it has proven advantageous if the material which is permeable to radio waves is image-dense. For example, the material which is permeable to radio waves can be coated, painted, made opaque or tinted or colored in some other way, so that a human viewer outside the notchback motor vehicle is prevented from looking directly into the interior of the trunk lid, that is to say between the inner part and the outer paneling part, or seeing a shell structure, arranged between the inner part and the outer paneling part, of the trunk lid. This is because such a shell structure is particularly unattractive in esthetic terms and could also permit a potential thief to obtain information about equipment inside the notchback motor vehicle. In order therefore to prevent people from looking in between the outer paneling part and the inner part, the material which is permeable to radio waves is made essentially opaque and non-translucent or even non-transparent.

In order to provide a particularly large region through which radio waves pass it has proven particularly advantageous if at least one visual bend in the trunk lid is formed in the material which is permeable to radio waves. At the visual bend in the trunk lid, two material regions of the trunk lid which adjoin one another directly and are connected to one another enclose an angle with one another, in particular at least substantially a right angle. If the trunk lid is mounted on the notchback motor vehicle, the visual bend can run, for example, between an at least essentially horizontal surface of the trunk lid and an at least essentially perpendicular surface of the trunk lid. This means that, for example, the visual bend can be a rear-side edge of the trunk lid and/or of the motor vehicle, wherein the material which is permeable to radio waves is arranged on both sides of the visual bend or of the rear-side edge.

Finally, an embodiment has proven advantageous in which the inner part is formed, at least in the region through which radio waves pass, from a further material which is permeable to radio waves. Consequently, the material which is permeable to radio waves and from which the outer paneling part in the region through which radio waves pass is constructed is a first material which is permeable to radio waves, wherein the further material which is permeable to radio waves and from which the inner part in the region through which radio waves pass is manufactured is a second material which is permeable to radio waves. It is also conceivable, however, that the same material which is permeable to radio waves is used in both cases, so that the first material which is permeable to radio waves is used both on the inner part and on the outer paneling part. Equally, the second material which is permeable to radio waves can be used both on the inner part and on the outer paneling part. At any rate, in the region through which radio waves pass, the trunk lid is penetrated completely by the first and/or the second material which is permeable to radio waves. This provides in particular the advantage that the antennas which are assigned to the transmission and/or reception devices can be arranged away from the trunk lid, for example in the interior of the trunk. In this context, the image density which is described above leads, where applied, to protection against theft since people are effectively prevented from looking into the trunk and in particular from seeing objects which are arranged in the trunk.

The invention also relates to a motor vehicle which comprises on its notchback a trunk lid having at least one inner part which comprises a receptacle for at least one antenna of the motor vehicle, and having at least one outer paneling part which is connected to the inner part. In order to construct the motor vehicle in such a way that its transmission and/or reception devices can be operated particularly efficiently in the passenger compartment of the motor vehicle, there is provision according to the invention that the outer paneling part is constructed, at least in a region through which radio waves pass, from a material which is permeable to radio waves. In particular, the motor vehicle is the notchback motor vehicle as described above, and the trunk lid is the trunk lid as described above, with the material which is permeable to radio waves, as described above.

Further features of the invention can be found in the claims, the figures and the description of the figures. The features and combinations of features which are mentioned above in the description and the features and combinations of features which are mentioned below in the description of the figures and/or shown solely in the figures can be used not only in the respectively specified combination but also in other combinations or alone.

The invention will now be explained in more detail by means of preferred exemplary embodiments and with reference to the drawings.

BRIEF DESCRIPTION OF THE DRAWINGS

Identical or functionally identical elements are provided with the same reference symbol in the figures.

DETAILED DESCRIPTION OF THE DRAWINGS

Figure 1:
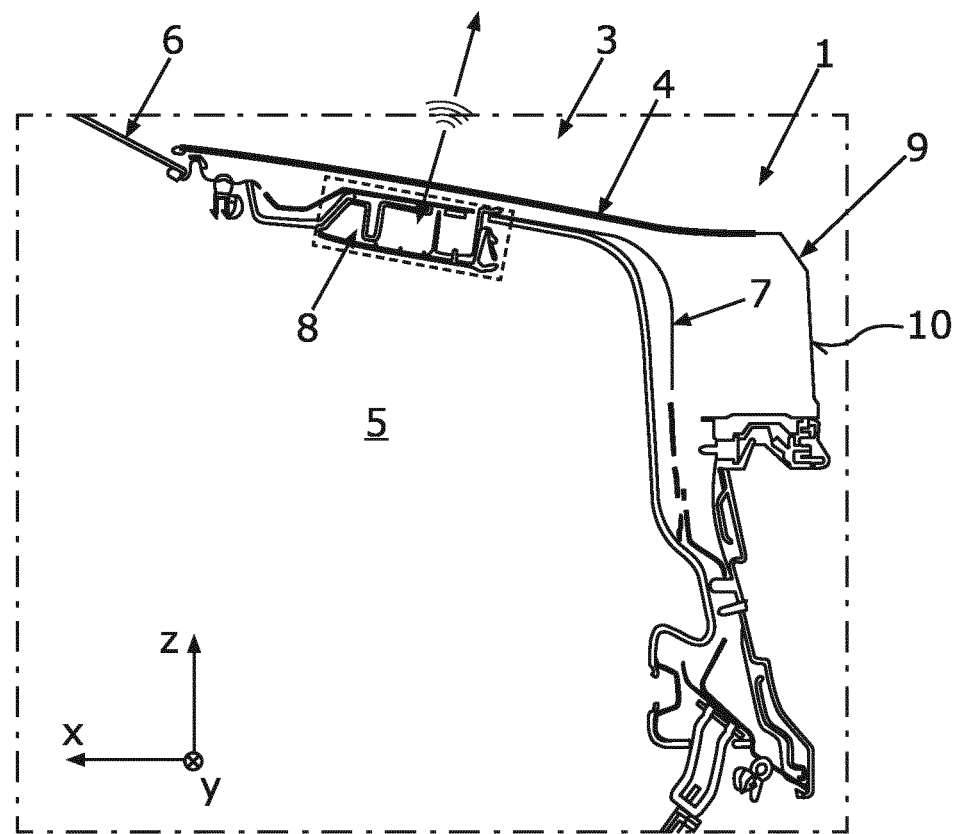
FIG. 1 shows a schematic and sectional illustration of a trunk lid of a notchback motor vehicle having a material which is permeable to radio waves.

FIG. 1 shows a schematic and sectional illustration of a trunk lid 1 of a notchback motor vehicle 2 (shown for the first time in FIG. 2), wherein the trunk lid 1 has, in a region 3 through which radio waves pass, a material 4 which is permeable to radio waves. The trunk lid 1 serves to close a trunk 5 of the notchback motor vehicle 2, which is embodied as a passenger motor vehicle in the present example. When the trunk lid 1 pivots between a closed state (as shown in the figures) and an open state (not shown), a rear windshield 6 of the notchback motor vehicle 2 remains unmoved. Furthermore, the trunk 5 of the notchback motor vehicle 2 cannot be readily reached from a passenger cell of the notchback motor vehicle, so that a user of the notchback motor vehicle 2 cannot access the trunk 5 from the passenger compartment. In other words, the trunk 5 is structurally separate or separated from the passenger compartment of the notchback motor vehicle. If it is possible for the user of the motor vehicle 2 to access the trunk 5 from the passenger compartment by, for example, merely moving a parcel shelf or loading space cover, such a motor vehicle is not considered to be a notchback motor vehicle 2. As a result, for example station wagons, off road vehicles, fastback limousines and other motor vehicles which meet these criteria are not considered to be notchback motor vehicles 2. In direct contrast to this, for example sedans and convertibles are considered to be notchback motor vehicles 2 according to this description.

During fabrication, in particular series fabrication processes, of the notchback motor vehicle 2 there is a need to integrate at least one antenna of the motor vehicle 2 into the trunk lid 1. For this purpose, the trunk lid 1 has, in contrast to conventional trunk lids, the region 3 through which radio waves pass and which is designed to allow radio waves to pass through it particularly efficiently. In other words, the region 3 of the trunk lid 1 through which radio waves pass is designed to cause only a particularly low power dissipation during the transmission and/or reception of radio waves. Signals and/or data can be transmitted between the notchback motor vehicle 2, in particular its transmission and/or reception devices, and corresponding opposing points in the surroundings of the motor vehicle 2, by means of the radio waves.

The trunk lid 1 has at least one inner part 7 which comprises a receptacle 8 for at least one antenna of the motor vehicle 2. Furthermore, the trunk lid 1 has at least one outer paneling part 9 which is connected to the inner part 7 and which forms part of an outer skin 10 of the notchback motor vehicle 2. The inner part 7 and the outer paneling part 9 are connected to one another in a frictionally locking, positively locking and/or materially joined fashion, for example welded or bonded, etc. Alternatively, the inner part 7 and the outer paneling part 9 can be embodied in one piece with one another.

In order then to ensure that the radio waves of the transmission and/or reception devices of the notchback motor vehicle 2 or of the corresponding opposing points in the surroundings of the notchback motor vehicle 2 penetrate as unimpeded as possible the outer skin 10 and/or the outer paneling part 9 and arrive at the antenna or the antennas which can be or are arranged in the receptacle 8, in the region 3 through which radio waves pass the outer paneling part 9 is constructed from the material 4 which is permeable to radio waves.

The material 4 which is permeable to radio waves comprises, in the present example, a glass or is manufactured at least essentially from the glass. Since the material 4 which is permeable to radio waves and is formed from glass in the present example is particularly hard in contrast to conventional materials which are used to construct a trunk lid, the material 4 through which radio waves can pass has greater stability, for example a higher torsional rigidity, than the conventional material. As a result, the material 4 through which radio waves pass and/or the glass serve/serves as a reinforcement element of the trunk lid 1. In other words, owing to the material 4 through which radio waves can pass or owing to the glass, the trunk lid 1 is more rigid and/or more resistant to bending and/or torsion in comparison with a conventional trunk lid without the region 3 through which radio waves can pass.

Furthermore, the material 4 through which radio waves can pass, and which is composed of glass, permits the radio waves to pass particularly efficiently through the outer paneling part 9 and/or through the outer skin 10.

Figure 2:
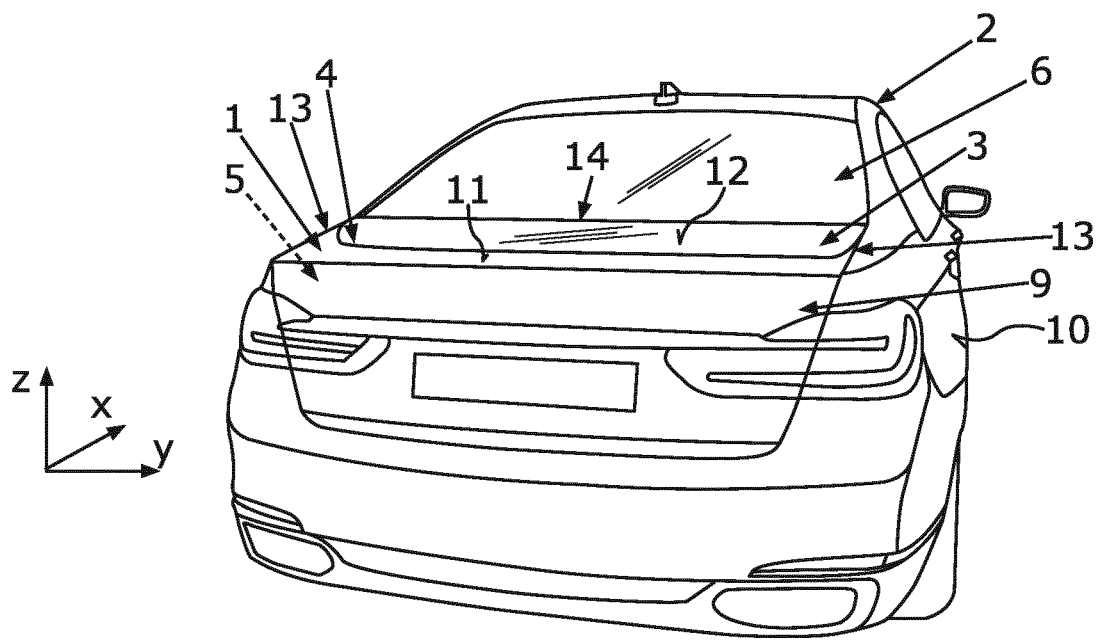
FIG. 2 shows a perspective and schematic illustration of a rear part of the notchback motor vehicle.

If a plurality of antennas which are constructed differently from one other are used in the notchback motor vehicle 2, it is of particular advantage if the region 3 through which radio waves pass is constructed over a particularly large area. In this regard, FIG. 2 shows a perspective and schematic illustration of a rear part of the notchback motor vehicle 2, the trunk lid 1 of which is equipped with the material 4 which is permeable to radio waves and/or with the glass in the region 3 through which radio waves pass. It is to be noted that a first partial surface 11 of the outer paneling part 9 and a second partial surface 12 of the outer paneling part 9 terminate flush with one another, wherein the first partial surface 11 is arranged outside the region 3 through which radio waves pass, and the second partial surface 12 is arranged inside the region 3 through which radio waves pass. Furthermore, FIG. 2 clearly shows that the material 4 which is permeable to radio waves or the glass extends completely at least between two edges 13, lying opposite one another, of the trunk lid 1. In the present example, the material 4 which is permeable to radio waves extends between the two edges 13, which are embodied, for example, as a respective longitudinal edge, here as a respective longitudinal end edge, of the trunk lid 1, at which the trunk lid 1 ends, and said material 4 extends to an outer skin component, constructed differently from the trunk lid, of the motor vehicle 2.

The material 4 of the trunk lid 1 which is permeable to radio waves can alternatively or additionally extend, in particular, completely between two transverse edges, in particular transverse end edges, in the region 3 through which radio waves pass. In FIG. 2, the material 4 which is permeable to radio waves adjoins a front-side transverse edge 14 of the trunk lid 1. This means that the transverse edge 14, which in the present example is a transverse end edge of the trunk lid 1, can be formed by the material 4 which is permeable to radio waves, or that the material 4 which is permeable to radio waves directly adjoins the transverse edge 14 or the transverse end edge of the trunk lid 1.

Figure 3:
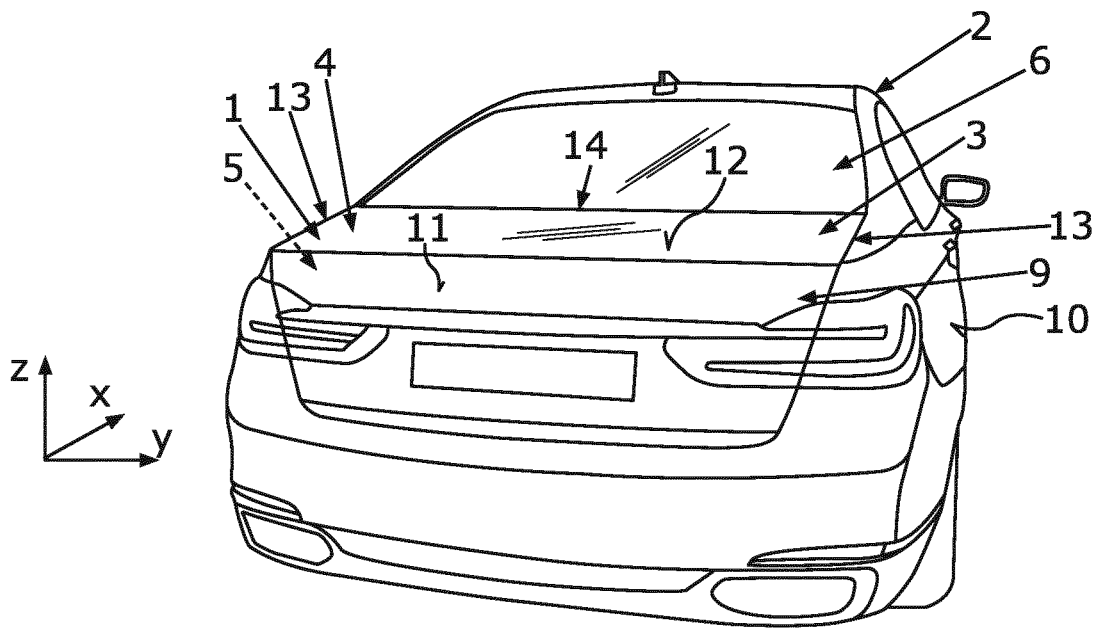
FIG. 3 shows a perspective and schematic illustration of the rear part of the notchback motor vehicle with the trunk lid according to a further embodiment.

FIG. 3 shows a perspective and schematic illustration of the rear part of the notchback motor vehicle 2 with the trunk lid 1 according to a further embodiment, in which the material 4 which is permeable to radio waves completely extends both between the longitudinal edges 13 and between the transverse edges 14 in the region 3 of the trunk lid 1 which is permeable to radio waves.

Figure 4:
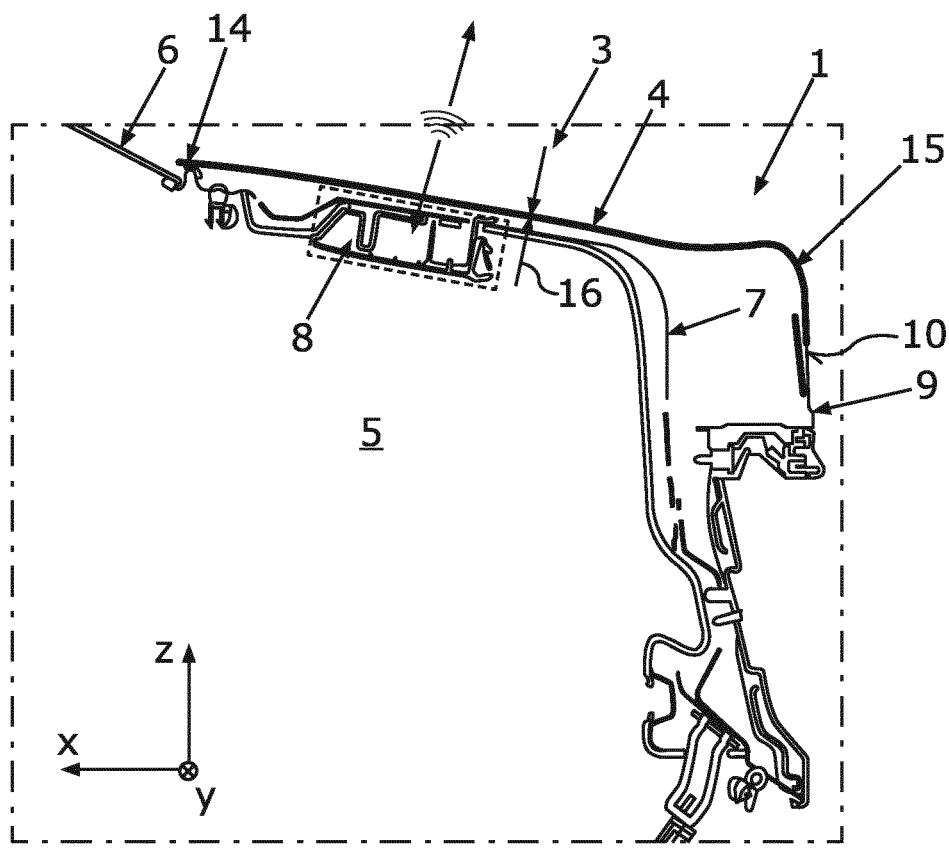
FIG. 4 shows a schematic and sectional illustration of the trunk lid of the notchback motor vehicle having the trunk lid according to a further embodiment.

FIG. 4 shows a schematic and sectional illustration of the trunk lid 1 of the notchback motor vehicle 2 with the trunk lid 1 according to a further embodiment in which at least one visual bend 15 of the trunk lid 1 is formed in the material 4 which is permeable to radio waves. The visual bend 15 can be embodied, for example, as a rear-side transverse edge which lies opposite the front-side transverse edge 14 and extends at least essentially parallel thereto. In this embodiment, therefore, the following profile is obtained along the trunk lid 1, starting from the front-side transverse edge 14 for the material 4 which is permeable to radio waves and for the region 3 through which radio waves pass: the material 4 which is permeable to radio waves forms the front-side transverse edge 14 or is arranged directly on the front-side transverse edge 14. From there, the material 4 which is permeable to radio waves extends at least essentially along a longitudinal direction x of the vehicle (see coordinate systems in the figures) as far as the visual bend 15 or up to the rear-side transverse edge and beyond it—then along a vertical direction z of the vehicle. This means that the material 4 which is permeable to radio waves includes an angle, for example a right angle, at the visual bend 15. As a result, not only an upper side of the trunk lid 1 which is arranged at least essentially horizontally is formed at least partially by the material 4 which is permeable to radio waves but also a rear side of the trunk lid 1 which is at least essentially perpendicular is formed at least in certain areas by the material which is permeable to radio waves, as a result of which a particularly large region 3 which is permeable to radio waves is produced so that the trunk lid 1 is configured in a particularly flexible way with respect to an installation location of the receptacle 8 for the antenna or for the antennas.

FIG. 4 also shows a material thickness 16 of the outer paneling part 9 which has the material 4 which is permeable to radio waves in the region 3 through which radio waves pass. In all the embodiments of the trunk lid 1 which are described herein, the material thickness 16 of the outer paneling part 9 is formed completely, in the region 3 through which radio waves pass, by the material 4 which is permeable to radio waves. In other words, in the region 3 through which radio waves pass the trunk lid 1 is formed completely by the material 4 which is permeable to radio waves or by the glass. As a result, the material thickness 16 of the material 4 which is permeable to radio waves corresponds, in the region 3 through which radio waves pass, to the material thickness 16 of the outer paneling part in the region 3 through which radio waves pass. This means that in the region 3 through which radio waves pass the outer paneling part 9 is penetrated completely by the material 4 which is permeable to radio waves, insofar as the outer paneling part 9 comprises the material 4 which is permeable to radio waves, and a further material which is different therefrom.

In order to prevent a human viewer from seeing between the outer paneling part 9 and the inner part 7 of the trunk lid from outside the notchback motor vehicle 2, the material 4 which is permeable to radio waves is constructed in an opaque or non-translucent or even non-transparent fashion and at any rate in an image-dense fashion. In the event of the material 4 which is permeable to radio waves being glass, the glass can be embodied as milk glass which scatters light diffusely in such a way that a human viewer is still prevented from looking clearly and without distortion between the outer paneling part 9 and the inner part 7.

Figure 5:
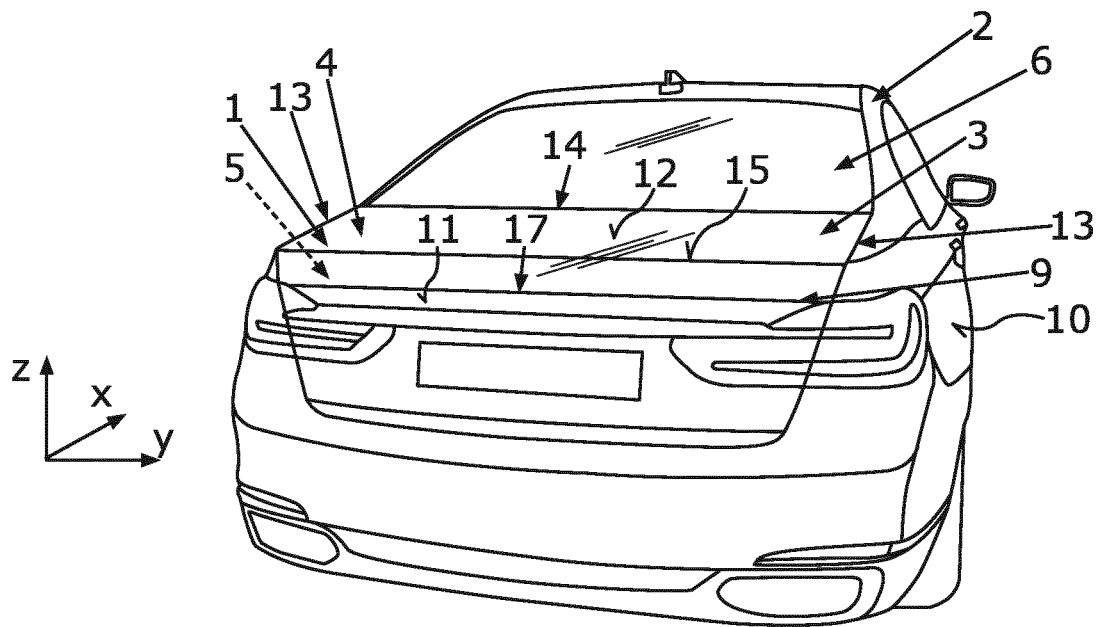
FIG. 5 shows a perspective and schematic illustration of the rear part of the notchback motor vehicle according to a further embodiment.

FIG. 5 shows a perspective and schematic illustration of the rear part of the notchback motor vehicle 2 according to a further embodiment, wherein the visual bend 15 is formed in the material 4 which is permeable to radio waves. It is apparent from FIG. 5 that the material 4 which is permeable to radio waves can be recessed at an emblem region 17 in order to emphasize the company affiliation of the notchback motor vehicle 2. In particular, when glass is used as the material 4 which is permeable to radio waves, a particularly striking design element is produced in combination with directly adjoining, conventionally painted surfaces, since the glass of the material 4 which is permeable to radio waves makes a surface possible which is particularly smooth and shiny as well at the same time dark. Such an effect would in fact be achievable by means of partial painting of the trunk lid 1, but this is particularly costly and therefore not very compatible with series production of the trunk lid 1.

Figure 6:
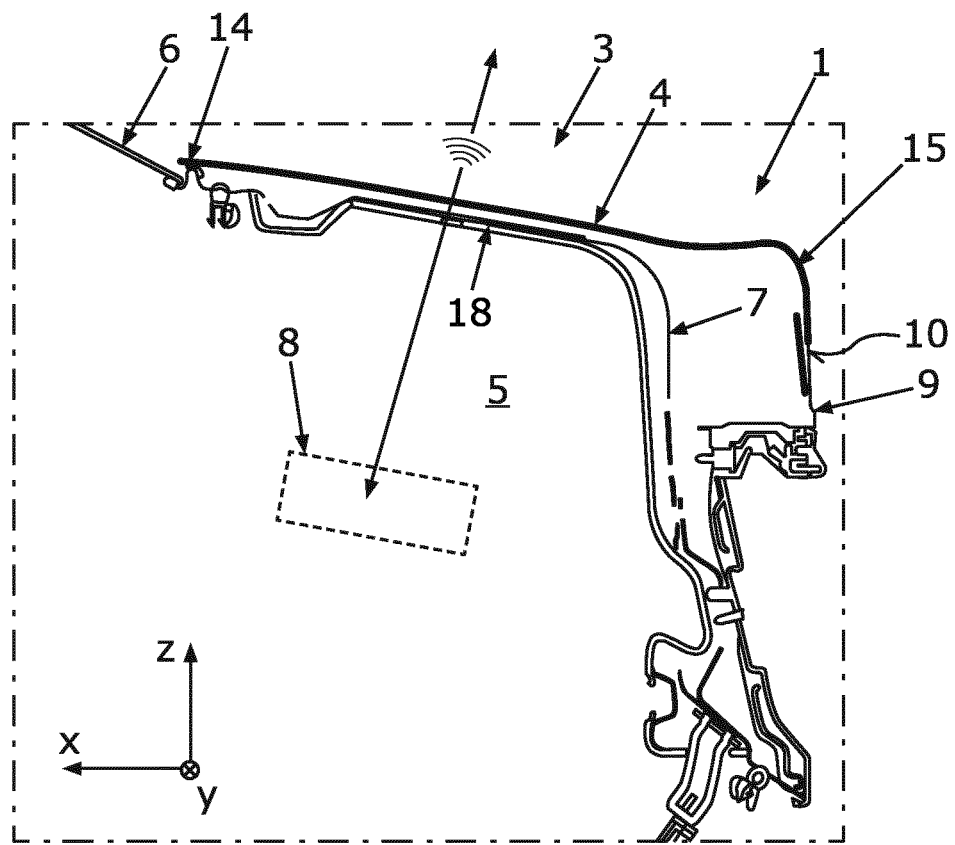
FIG. 6 shows a schematic and sectional illustration of the trunk lid of the notchback motor vehicle, wherein a further material which is permeable to radio waves is arranged on an inner part of the trunk lid.

FIG. 6 shows a schematic and sectional illustration of the trunk lid 1 of the notchback motor vehicle 2, wherein a further material 18 which is permeable to radio waves is arranged on the inner part 7 of the trunk lid 1. The further material 18 which is permeable to radio waves can be, for example, the material 4 which is permeable to radio waves or the glass. This means that the glass can be arranged both on the outer paneling part 9 and on the inner part 7 of the trunk lid 1. Alternatively, the material 18 which is permeable to radio waves can be a material which is different from the material 4 which is permeable to radio waves, for example a plastic. The further material 18 which is permeable to radio waves is also arranged in the region 3 of the trunk lid 1 through which radio waves pass so that it is possible for the radio waves to pass with as little loss as possible both through the outer paneling part 9 and through the inner part 7 of the trunk lid 1. In this way it is particularly advantageously made possible for the receptacle 8 to be arranged on the other side of the trunk lid 1, for example in the interior of the trunk 5, as a result of which the trunk lid 1 itself can be manufactured in a way which is particularly efficient in terms of material and/or mass. This makes it possible for the user of the notchback motor vehicle 2 to be able to pivot the trunk lid 1 particularly easily between the closed position and the open position. Furthermore, a possible supporting mechanism can also be embodied in a way which is particularly efficient in terms of mass, as a result of which the notchback motor vehicle 2 which is equipped with this trunk lid can in turn be constructed in a way which is particularly efficient in terms of mass, that is to say in a particularly lightweight fashion, so that the notchback motor vehicle 2 can be manufactured and/or operated in a way which is particularly compatible with the environment.

In the event of the further material 18 which is permeable to radio waves and the material 4 which is permeable to radio waves each comprising glass or each being at least essentially manufactured from glass, the material 4 which is permeable to radio waves and/or the further material 18 which is permeable to radio waves can each be coated, painted, made opaque, tinted or colored in some other way, in order to prevent a human viewer from looking through the outer paneling part 9, in particular in a non-distorted way, from outside the notchback motor vehicle 2. This effectively ensures that a human viewer cannot check out the interior of the trunk 5 and in particular objects stored therein from outside the notchback motor vehicle 2.

Overall, the invention remedies the problem of locating antennas in conventional tailgates, wherein these conventional tailgates are formed at least essentially from steel, aluminum or some other metallic material. This is because in these conventional tailgates radio waves which pass through these tailgates are subject to a particularly high degree of shielding and, as a result, particularly high power dissipation. For example in the case of motor vehicles which have a notchback and/or in which it is not expedient to arrange the antennas in the respective roof region, in particular in convertibles, it is, however, necessary to arrange the antennas in the respective tailgate. The present invention therefore proposes providing at least essentially horizontal faces of a tailgate as an integrative and/or structural component with the material 4, 17 which is permeable to radio waves, in particular glass. For this purpose, a glass pane can be used which is embodied over the entire surface, that is to say as far as a respective edge, or inserted, that is to say into a carrier structure of the tailgate. In this context, the glass pane or the material 4 which is permeable to radio waves performs the design, rigidity and/or functional tasks, wherein the functional task consists in ensuring the permeability to radio waves so that antennas of the motor vehicle or notchback motor vehicle 2 can be arranged under the glass pane.

Although it is known from the prior art that plastic could be used as the material 4, 17 which is permeable to radio waves, the solution proposed herein to use glass as the material 4, 17 which is permeable to radio waves has proven particularly advantageous.

LIST OF REFERENCE NUMBERS

1 trunk lid
2 notchback motor vehicle
3 region through which radio waves pass
4 material which is permeable to radio waves
5 trunk
6 rear windshield
7 inner part
8 receptacle
9 outer paneling part
10 outer skin
11 first partial surface
12 second partial surface
13 longitudinal edge
14 transverse edge
15 visual bend
16 material thickness
17 emblem region
18 material which is permeable to radio waves

What is claimed is:

1. A trunk lid for closing a trunk of a notchback motor vehicle, comprising:
   at least one inner part which comprises a receptacle for at least one antenna of the motor vehicle; and
   at least one outer paneling part which is connected to the inner part, wherein
      the outer paneling part is constructed, at least in a region through which radio waves pass, from a material which is permeable to radio waves, wherein the material which is permeable to radio waves is glass, wherein either:
a) the material which is permeable to radio waves extends completely at least between two edges of the trunk lid which are opposite one another, or
b) at least one visual bend in the trunk lid is formed in the material which is permeable to radio waves.

2. The trunk lid according to claim 1, wherein
   the material which is permeable to radio waves forms a reinforcement element of the trunk lid.

3. The trunk lid according to claim 1, wherein
   the material which is permeable to radio waves extends completely at least between two edges of the trunk lid which are opposite one another.

4. The trunk lid according to claim 1, wherein
   in the region through which radio waves pass, a material thickness of the outer paneling part is formed completely by the material which is permeable to radio waves.

5. The trunk lid according to claim 1, wherein
   a first partial surface of the outer paneling part outside the region through which radio waves pass and a second partial surface of the outer paneling part in the region through which radio waves pass, terminate flush with one another.

6. The trunk lid according to claim 1, wherein
   the material which is permeable to radio waves is image-dense.

7. The trunk lid according to claim 1, wherein
   at least one visual bend in the trunk lid is formed in the material which is permeable to radio waves.

8. The trunk lid according to claim 1, wherein
   the inner part is formed, at least in the region through which radio waves pass, from a further material which is permeable to radio waves.

9. A motor vehicle, comprising:
   a notchback having a trunk lid, wherein
   the trunk lid comprises at least one inner part which includes a receptacle for at least one antenna of the motor vehicle, and at least one outer paneling part which is connected to the inner part, and
   the outer paneling part is constructed, at least in a region through which radio waves pass, from a material which is permeable to radio waves, wherein the material which is permeable to radio waves is glass, wherein either:
a) the material which is permeable to radio waves extends completely at least between two edges of the trunk lid which are opposite one another, or
b) at least one visual bend in the trunk lid is formed in the material which is permeable to radio waves.

10. The trunk lid according to claim 1, wherein
    the material which is permeable to radio waves is harder and has a higher torsional rigidity than a material which comprises the trunk lid.

11. The trunk lid according to claim 1, wherein
    the outer paneling part is constructed from: i) a first partial surface, and ii) a second partial surface,
    the first partial surface and the second partial surface terminate flush with one another,
    the first partial surface is made of glass, and
    the second partial surface is made of sheet metal.

* * * * *